United States Patent [19]

Cooper

[11] 4,426,364

[45] Jan. 17, 1984

[54] REMOVAL AND RECOVERY OF NITROGEN OXIDES AND SULFUR DIOXIDE FROM GASEOUS MIXTURES CONTAINING THEM

[76] Inventor: Hal B. H. Cooper, 4234 Chevy Chase Dr., La Canada Flintridge, Calif. 90017

[21] Appl. No.: 311,521

[22] Filed: Oct. 15, 1981

Related U.S. Application Data

[60] Division of Ser. No. 925,850, Jul. 18, 1979, abandoned, which is a continuation-in-part of Ser. No. 714,793, Aug. 16, 1976, abandoned, and Ser. No. 823,051, Aug. 10, 1977, abandoned, and a continuation-in-part of Ser. No. 714,792, Aug. 16, 1976, abandoned, and Ser. No. 909,026, May 24, 1978, abandoned, which is a continuation of Ser. No. 812,814, Jul. 5, 1977, abandoned, which is a continuation-in-part of Ser. No. 714,792, Aug. 16, 1976, abandoned.

[51] Int. Cl.$^3$ .................... C01B 21/00; C01B 17/00; C01B 21/40

[52] U.S. Cl. .................... 423/235; 423/242; 423/393; 423/395; 423/438; 423/523; 423/551; 423/584; 204/98

[58] Field of Search .............. 423/235, 242 R, 390, 423/393, 394, 400, 523, 524, 427, 551, 584, 395, 438; 204/98

[56] References Cited

U.S. PATENT DOCUMENTS

| | | | |
|---|---|---|---|
| 910,530 | 1/1909 | Halvorsen | 423/393 |
| 2,013,984 | 9/1935 | Gross | 423/395 |
| 2,055,084 | 9/1936 | MacMullin | 423/427 |
| 3,733,393 | 5/1973 | Couillaud et al. | 423/393 X |
| 3,971,844 | 7/1976 | Schneider | 423/551 |
| 3,979,191 | 9/1976 | Furuta | 423/235 |
| 3,991,167 | 11/1976 | Depommier | 423/393 |
| 4,003,987 | 1/1977 | Paull et al. | 423/524 |

FOREIGN PATENT DOCUMENTS

| | | | |
|---|---|---|---|
| 297901 | 9/1919 | Fed. Rep. of Germany | 423/390 |
| 2304784 | 8/1973 | Fed. Rep. of Germany | 423/242 R |
| 1387207 | 12/1964 | France | 423/235 |
| 49-30272 | 3/1974 | Japan | 423/235 |
| 51-76163 | 7/1976 | Japan | 423/235 |

*Primary Examiner*—Gregory A. Heller
*Attorney, Agent, or Firm*—Joseph E. Mueth

[57] ABSTRACT

A cyclic process for removing lower valence nitrogen oxides from gaseous mixtures includes treating the mixtures in a first stage with an acidic aqueous media including a peroxygen oxidant to form nitric acid and higher valence nitrogen oides and to capture these oxides as alkali metal salts, especially nitrites and nitrates, in a carbonate/bicarbonate-containing product aqueous media in a second stage. Highly selective recovery of nitrates in high purity and yield may then follow, as by crystallization, with the carbonate and bicarbonate alkali metal salts strongly increasing the selectivity and yield of nitrates. The product nitrites are converted to nitrates by oxidation after lowering the product aqueous media pH to below about 9.

Where the gas mixtures include both sulfur dioxide and lower valence nitrogen oxides, the processes for removing lower valence nitrogen oxides and sulfur dioxide may be combined into a single removal/recovery system, or may be effected in sequence.

10 Claims, 3 Drawing Figures

REMOVAL AND RECOVERY OF NITROGEN OXIDES AND SULFUR DIOXIDE FROM GASEOUS MIXTURES CONTAINING THEM

This application is a divisional application of U.S. Ser. No. 925,850 filed July 18, 1979 and entitled "Removal and Recovery of Nitrogen Oxides and Sulfur Dioxide from Gaseous Mixtures Containing Them", now abandoned which in turn is a continuation-in-part of U.S. Ser. No. 714,793 filed August 1976 and entitled "Removal of Nitrogen Oxides from Gaseous Mixtures" (now abandoned); and U.S. Ser. No. 823,051, filed Aug. 10, 1977 and entitled "Removal and Recovery of Nitrogen Oxides and Sulfur Dioxide from Gaseous Mixtures Containing Them", now abandoned which in turn, was a continuation-in-part of U.S. Ser. No. 714,792 filed Aug. 16, 1976 and entitled "Removal of Nitrogen Oxides from Gaseous Mixtures" (now abandoned); and U.S. Ser. No. 909,026 filed May 24, 1978 which in turn, now abandoned, was a continuation of U.S. Ser. No. 812,814 filed July 5, 1977 and entitled "Removal and Recovery of Nitrogen Oxides and Sulfur Dioxide from Gaseous Mixtures Containing Them" (now abandoned), which in turn was a continuation-in-part of U.S. Ser. No. 714,792 filed Aug. 16, 1976 and entitled "Removal of Nitrogen Oxides from Gaseous Mixtures" (now abandoned).

BACKGROUND OF THE INVENTION

This invention relates to processes for removing and recovering sulfur dioxide and nitrogen oxides from gas mixtures containing them and especially from mixtures having low concentrations of these substances. Such mixtures include combustion gases produced in burning coal, oil, and other low molecular weight hydrocarbons in power plants, industrial furnaces and the like. Lower valence nitrogen oxides such as nitric oxide (NO) are extremely difficult to remove from such mixtures. However, nitrogen oxides are regarded as air pollutants and many nations now mandate reducing their emission into the atmosphere. This invention not only permits compliance with such mandates, but permits recovery of these pollutants as commercially valuable products in such quantity and quality that air pollution control may become profitable at best, or at least far less costly.

Where a gas mixture includes both sulfur dioxide and lower valence nitrogen oxides, and removal of both is desirable, these new processes for removing and recovering sulfur dioxide and lower valence nitrogen oxides may be combined into a single step, or may be effected sequentially.

The most common oxide of nitrogen in combustion gases is the lower valence nitric oxide (NO), which generally exceeds the concentration of nitrogen dioxide by a factor of about 10. In these combustion gas mixtures, lower valence oxides of nitrogen may be present in concentrations in the range of about 200 to about 20,000 parts per million. But since these mixtures are evolved at such rapid rates, for example, about 1,000,000 cubic feet per minute from a 500 megawatt power plant, the quantity emitted to the atmosphere is very large and creates a serious air pollution problem. The processes of this invention are especially applicable in minimizing these emissions, or at least lowering them to, say, about 50 parts per million, without seriously impeding the high flow rate of the gas stream from the power plant to the atmosphere.

The conversion of lower valence nitrogen oxides to higher valence nitrogen oxides to facilitate their removal from a gas mixture is, broadly, not an entirely new concept. Thus, for example, U.S. Pat. Nos. 1,420,477; 3,733,393, and 3,927,177 propose oxidizing oxides of nitrogen to remove them more easily from gaseous streams. All of these primarily seek simple removal of the pollutants and are costly to operate. None discloses removing pollutant nitrogen oxides or sulfur dioxide or both from combustion gases and recovering them as useful products in a practical and economic manner. Combustion gases from the burning of carbonaceous fuels also include substantial quantities of carbon dioxide. These quantities may be in the range of about 5% to about 20% by volume. Although emission of carbon dioxide to the atmosphere is not presently under severe attack as an environmental problem, capture and recovery of carbon dioxide may be highly desirable to provide raw materials for other commercially valuable products. The recovery techniques that form important parts of the processes of this invention permit recovery of large volumes of carbon dioxide in high purity at low cost, thus contributing to the overall efficiency and economy of these processes.

SUMMARY OF THE INVENTION

This invention provides processes for treating gas mixtures including carbon dioxide and nitrogen oxides comprising treating a gas mixture including these gases with aqueous media including an acid selected from the group consisting of sulfuric and/or nitric acids and a peroxygen substance to convert the lower valence nitrogen oxides to nitric acid and other higher valence nitrogen oxides in which the ratio of the peroxygen substance to dinitrogen trioxide and nitrogen dioxide ($N_2O_3$ and $NO_2$) is greater than the stoichiometric amount and the treating temperature is not more than about 100° C., preferably not more than about 80° C. In practice, the gas treating is effected at temperatures in the range of about 40° C. to about 60° C. where the gas mixture is a combustion fuel gas.

The peroxygen substance is preferably hydrogen peroxide, but may be a peroxy-acid such as peroxysulfuric acid or peroxyphosphoric acid.

The acid is preferably nitric, and the peroxygen substance is hydrogen peroxide. Alternatively, the acid may be sulfuric, and the peroxygen substance, peroxysulfuric acid. In a practical sense, however, since many carbonaceous fuels contain sulfur, and some sulfur dioxide will be present along with the oxides of nitrogen, the presence of some sulfuric acid is to be expected as part of the acid component.

The process preferably includes two steps. First, the gas stream with lower valence nitrogen oxides is treated with aqueous media that includes an acid and a peroxygen substance to form nitric acid and other higher valence nitrogen oxides. Second, the nitric acid and other higher valence nitrogen oxides are treated with an aqueous alkaline carbonate/bicarbonate media to remove the higher valence oxides of nitrogen as nitrites and nitrates. A plurality of zones may be employed, with the number depending upon the flow rate of the gas, the oxidizing efficiency of the acid/peroxygen substance system employed, and the extent to which the level of nitrogen oxides is to be reduced. Alternately, or concomitantly, the process may be conducted so as to also produce nitric acid and sulfuric acid as products by withdrawal from the primary oxidation step.

The acid acts as an oxidation catalyst in this process. The peroxygen substance provides the oxygen needed to oxidize lower valence nitrogen oxides to higher valence forms. The combination of peroxygen substance and acid is much more active and effective than the peroxygen substance alone. Though the acid may also act as an oxidant, such as with nitric acid, any such oxidation reduces the acid to a lower valence form, which in turn is reoxidized by the peroxygen substance in the aqueous media. The dual reagent oxidizing system of this invention permits a major reduction in the size of the scrubbing equipment necessary with other systems and, accordingly, produces a significant reduction in the capital investment requirements. Because the quantities of combustion gas to be treated are exceedingly large and their flow rate rapid, the capital cost of scrubbing equipment is an extremely important consideration.

Hydrogen peroxide alone oxidizes nitric oxide very slowly when it is diluted with inert gases such as nitrogen and carbon dioxide and its removal from such gas mixtures is very slow. On the other hand, when a strong mineral acid such as sulfuric or nitric acid is combined with the hydrogen peroxide, particularly nitric acid, the rate of oxidation and removal is increased markedly. The acid promotes the solubility of the nitric oxide in the aqueous media by solvation and catalyzes the oxidation of intermediate compounds to nitric acid. It is known that hydrogen peroxide and nitrous acid form an unstable material, peroxynitrous acid, which rearranges to nitric acid at a very rapid rate in the presence of a strong mineral acid.

In the practice of the process, the acidic scrubbing media is recycled to build up the nitric acid content as the lower valence oxides of nitrogen are oxidized. Hydrogen peroxide is added to replace that consumed by the oxidation reaction and thus the nitric acid content can be raised to a high level despite the low concentration of nitrogen oxides in the gas stream.

Unlike the process disclosed in U.S. Pat. No. 3,733,393, the process of this invention does not rely upon operating at an elevated temperature above the boiling point of water. This is particularly important in treating combustion gases such as those emitted from a power plant where enormous volumes must pass through the processes at extremely high flow rates and where the effluent gases will fall to a temperature in the range of about 40° C. to about 60° C. upon contact with aqueous scrubbing solutions. The process of U.S. Pat. No. 3,733,393 is wholly impracticable commercially for removing and recovering lower valence nitrogen oxides from such gas mixtures for this reason. Further, the process is based on a one-pass concept and does not permit building up the concentration of nitric acid to a high level where it becomes more practical economically to recover nitric acid or alkali metal nitrates as commercially useful products.

Unlike the process disclosed in U.S. Pat. No. 3,991,167, the process of this invention does not require the conversion of nitric oxide to $N_2O_3$, dinitrogen trioxide, and $NO_2$, nitrogen dioxide, followed by reaction of the $N_2O_3$, and $NO_2$ with stoichiometric amount of hydrogen peroxide. That process is also impracticable for treating combustion gases. The new process claimed here utilizes the acid as a catalyst and a solvating agent to effect the direct oxidation of nitric oxide (NO) to nitric acid with hydrogen peroxide which is present in the aqueous scrubbing media.

Both nitric acid and peroxygen substances such as hydrogen peroxide are volatile liquids and have significant vapor pressures. Sulfuric acid has a markedly lower vapor pressure. Where nitric acid and hydrogen peroxide are used as the dual reagent system, the vapor pressure of each is determined by the temperature and by their concentration in the aqueous media. In the temperature range where this process preferably takes place, there can be an appreciable carryover of nitric acid and hydrogen peroxide from the oxidizing step because of their vapor pressure unless their concentration is reduced, as by dilution. Nitric acid is readily captured in the second alkaline scrubbing stage, but hydrogen peroxide is not so easily removed. The hydrogen peroxide concentration is desirably held to less than about 5% in the first step.

The concentration of the acid may vary widely, with increasing acid concentration generally increasing the rate of reaction. Preferably, the acid concentration in the first step is in the range of about 1% to about 60%, preferably about 20% to about 45%. The acid concentration also increases with increasing concentration of lower valence nitrogen oxides in the gaseous mixture.

A high nitric acid concentration speeds the rate of oxidation and facilitates recovery of nitrate products either as nitric acid or as nitrate salts. Nitric acid formed during oxidation may either be accumulated and withdrawn as a nitric acid-containing aqueous media, or may be allowed to rise to reach an equilibrium level and then be carried over in vapor form with the combustion gas undergoing treatment in the alkaline scrubbing state. There, the nitric acid is captured and removed as a salt such as an alkali metal or alkaline earth nitrate.

In the first stage oxidation, if no nitric acid aqueous media is withdrawn, the nitric acid tends to build up and equilibrate with the gas stream and balance with the amount of lower valence nitrogen oxides being oxidized to form nitric acid. For each mole of nitric oxide or nitrogen dioxide oxidized, an equivalent mole of nitric acid is thus formed, as by the following reactions:

$NO_2 + \frac{1}{2}H_2O_2 \rightarrow HNO_3$ $NO + 3/2 H_2O_2 \rightarrow HNO_3 + H_2O$

In addition to the primary oxidation reactions to produce nitric acid, nitrogen dioxide may also be produced which passes to the second stage absorber in the gas stream.

For example, where the lower valence nitrogen oxides consist of about 1,000 parts per million in the entering combustion gas stream, and with the process operating at about 55° C., the aqueous media in the oxidation step will equilibrate at about 40-45% nitric acid. Where the nitric oxide concentration is at the 500 parts per million level, the solution will equilibrate in the 35-40% nitric acid range. An equivalent amount of nitric acid is thus carried from the first step to the second with the treated gas stream under these conditions. When the concentration of nitric acid is lower than the equilibrium value, as when nitric acid is being removed as a product, less nitric acid passes to the second step stage.

Where nitric acid formed during oxidation passes from the first step to the second with other higher valence nitrogen oxides, along with the carbon dioxide, nitrogen and oxygen in the combustion gases, the nitric acid may be converted to a nitrate salt, preferably an alkali metal nitrate, and more preferably potassium nitrate. This is preferably effected by treating the gas stream that contains the nitric acid with an alkali metal (e.g., potassium) carbonate/bicarbonate aqueous media, preferably formed by reaction of potassium hydroxide with carbon dioxide in the gas stream.

Oxidation of lower valence nitrogen oxides in the first stage of the process of this invention also produces some partially oxidized nitrogen dioxide as well as fully oxidized nitric acid. When absorbed by the aqueous media of the second step of this process, nitrogen dioxide also forms a nitrite salt, as by the following reaction:

However, because nitrates are more easily removed from such media than are nitrites, the nitrites are desirably oxidized to nitrates.

Where nitric acid is desired as a product, the acidic aqueous scrubbing media from the primary oxidation step can be withdrawn and the nitric acid and sulfuric acid therein separated and recovered as products. In this case, the nitric acid concentration does not build up to as high a level as where the nitric acid is transferred in the gas stream to the second stage for recovery as alkali metal nitrate.

Utilizing alkali metal carbonate/bicarbonate aqueous media to convert nitric acid and other higher valence nitrogen oxides to alkali metal salts permits the concentration of these salts to rise to a level where recovery is commercially practicable because the carbonate/bicarbonate acceptor system captures and holds higher valence nitrogen oxides in aqueous media in non-volatile form. This permits recycling of the nitrate-containing aqueous media while retaining the higher valence nitrogen oxides in solution as nitrite and nitrate salts of alkali metal. Further, the acceptor system promotes highly selective recovery of alkali metal nitrates and nitrites in commercial quantities. Crystallization from aqueous media takes place at higher temperatures than would be expected, thus increasing the yield and minimizing the energy needed to evaporate and cool the product aqueous media to effect crystallization of the nitrate and nitrite products.

The alkali metal carbonate/bicarbonate acceptor system in aqueous media has additional benefits. For example, the aqueous media containing this system may be treated to recover some of all of the carbon dioxide absorbed from the gas stream. The presence of carbonates in the aqueous media facilitates crystallization and recovery of such alkali metal salts as potassium nitrate and potassium nitrite by lowering their solubilities to a major degree. In the aqueous media, conversion of carbonate to bicarbonate, as by the addition of carbon dioxide or nitric or sulfuric acids, lowers the pH of the product aqueous media. That in turn facilitates and expedites oxidation of nitrite to nitrate by oxidants such as hydrogen peroxide. Conversely, conversion of bicarbonate to carbonate by heating permits not only the recovery of relatively pure carbon dioxide in large quantities, but also facilitates the recovery of alkali metal nitrate by crystallization in high purity and yield.

The alkali metal makeup for that removed as alkali metal nitrate is preferably introduced to the treating step of the processes of this invention as alkali metal hydroxide, although it can be supplied as alkali metal carbonate. Preferably, the alkali metal hydroxide is electrolytically derived from alkali metal halide. Thus, for example, electrolysis of potassium chloride produces potassium hydroxide in aqueous media, as well as hydrogen and chlorine gases.

The alkali metal carbonate and bicarbonate used in the treating step of the processes of this invention forms during the treating process by reaction of carbon dioxide from the gas mixture with the alkali metal hydroxide fed thereto. At the carbon dioxide concentration normally prevailing in combustion gases, e.g., about 14%, both carbonate and bicarbonate are present in the aqueous media and the pH is likely to be 9 or greater. An excess of alkali metal carbonate/bicarbonate to acidic nitrate/nitrite is desirable in order to facilitate the absorption of the oxides of nitrogen from the gas stream. While a stoichiometric ratio can be used, the lower ratio requires a substantially larger and more costly gas-liquid contactor and the risk of incomplete removal. Surprisingly, lowering to pH to less than about 9 facilitates oxidation of nitrites to nitrates in the aqueous media. This lowering of the pH may be effected by adding sufficient acid to neutralize the carbonate and convert it to bicarbonate, or, preferably, by adding carbon dioxide to the media.

In these processes, this lowering of pH and conversion of nitrite to nitrate is best effected at the outset to utilize any hydrogen peroxide oxidant carried over in the gas stream from the primary oxidation stage and to raise the nitrate concentration before its recovery by crystallization. If the amount carried over and scrubbed out is insufficient, additional hydrogen peroxide can be added. However, this conversion may be postponed in the recycling of the aqueous media and may even follow the recovery of nitrate, provided sufficient oxidant is present or is added to the recycling media to effect the oxidation.

Another important step in recovering products from the aqueous media is decarbonation, where the bicarbonate formed in the treating step of the processes in converted to carbonate and carbon dioxide by heating the aqueous media and driving off the carbon dioxide. This heating may be effected by steam stripping or by evaporation. Generally, some evaporation of water is required to facilitate the crystallization of the product. The carbon dioxide so made is of high purity and may be captured for use in other processes, used for lowering the pH of the product aqueous media to facilitate oxidation of nitrite to nitrate, or both. Although decarbonation preferably follows conversion of nitrite to nitrate, decarbonation may follow immediately after the second step of the process. Following conversion of the bicarbonate to carbonate, the aqueous media is cooled to recover alkali metal nitrates, preferably by crystallization.

The processes of this invention are illustrated in FIGS. 1 through 3, which show the application of the new processes to a mixture of lower valence nitrogen oxides, sulfur dioxide, and carbon dioxide, which are normally found in emissions from the combustion of coal, oil and lower molecular weight hydrocarbons. This mixture is sometimes called stack gas or combustion gas.

Figure 1:
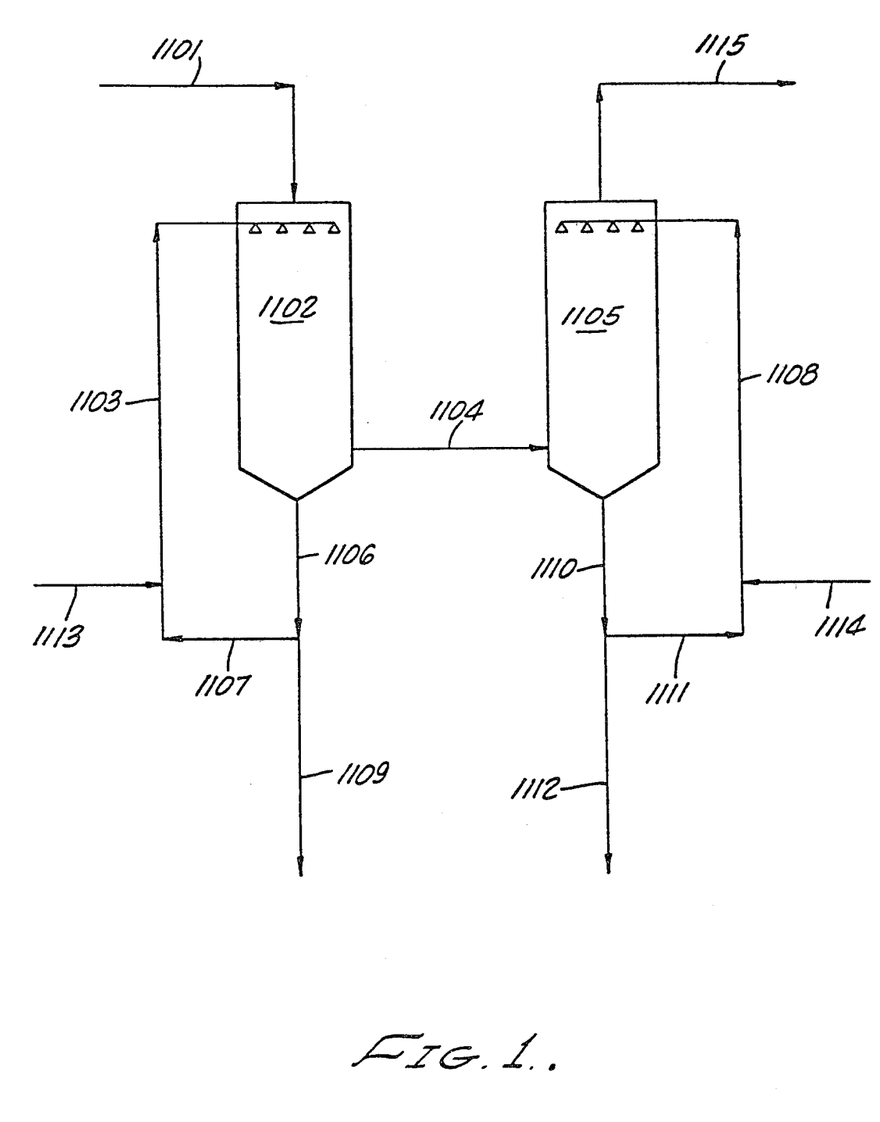
FIG. 1 illustrates a two-stage oxidation/scrubbing process for treating a gas stream that includes lower valence nitrogen oxides, sulfur dioxide, carbon dioxide, and accompanying oxygen and nitrogen. In this illustration, the acid is primarily nitric acid, and the peroxygen substance is hydrogen peroxide.

Referring now to FIG. 1, a combustion gas stream, comprising lower valence nitrogen oxides, and particularly nitric oxide, in low concentration and at a temperature in the range of about 50° C. to about 60° C. passes via line 1101 to oxidation tower 1102 where the stream is treated with an aqueous media entering via line 1103. The aqueous media includes nitric acid at a concentration usually greater than about 20% by weight, and hydrogen peroxide in a concentration usually less than 5% by weight, together with some sulfuric acid. In tower 1102, the following primary reactions take place:

$$NO_2 + \tfrac{1}{2} H_2O_2 \xrightarrow{HNO_3} HNO_3$$

$$NO + 3/2 H_2O_2 \xrightarrow{HNO_3} HNO_3 + H_2O$$

$$SO_2 + H_2O_2 \rightarrow H_2SO_4$$

Depending upon the products desired, nitric acid or alkali metal nitrate, the nitric acid, and other high valence nitrogen oxides, produces in tower 1102 pass either with the gas stream via line 1104 to scrubber tower 1105, or in the aqueous media with sulfuric acid via line 1106, or to both simultaneously.

The nitric acid and other lower valence nitrogen oxides in the gas stream passing from scrubber tower 1102 via line 1104 to tower 1105, are contacted with alkaline aqueous media entering tower 1105 via line 1108. The alkaline aqueous media preferably includes a carbonate/bicarbonate acceptor system such as potassium carbonate/bicarbonate, and some potassium nitrate recycling with aqueous media from previous scrubbing passes through tower 1105. Makeup potassium hydroxide enters line 1108 via line 1114, and reacts with the carbon dioxide in the gas stream to form potassium carbonate and potassium bicarbonate in the aqueous media. Within tower 1105, the following reactions would then take place:

$HNO_3 + K_2CO_3 \rightarrow KNO_3 + KHCO_3$ $2NO_2 + 2K_2CO_3 + H_2O \rightarrow KNO_3 + KNO_2 + 2KHCO_3$ The aqueous media passing from tower 1105 via line 1110 is in part, recycled via line 1111 to line 1108 for return to tower 1105. The balance of the aqueous media, which includes potassium nitrate and potassium nitrite, together with potassium carbonate and bicarbonate, passes to recovery of potassium nitrite and nitrate via line 1112.

Where the nitric acid and sulfuric acid pass primarily from tower 1102 via lines 1106 and 1109, the aqueous media is treated, as by distillation, to separate nitric and sulfuric acids from one another in substantial quantity and purity, and are recovered as such, treated further to produce salts of these acids, or the nitric or sulfuric acid recycled to maintain the desired balance. A portion of the aqueous effluent passing from tower 1102 via line 1106 is recycled via line 1107 to line 1103, to which incoming hydrogen peroxide, peroxysulfuric acid and nitric acid are added as necessary via line 1113.

Scrubbed combustion gas containing little sulfur dioxide and low concentration of nitrogen oxides passes to the atmosphere via line 1115.

Figure 2:
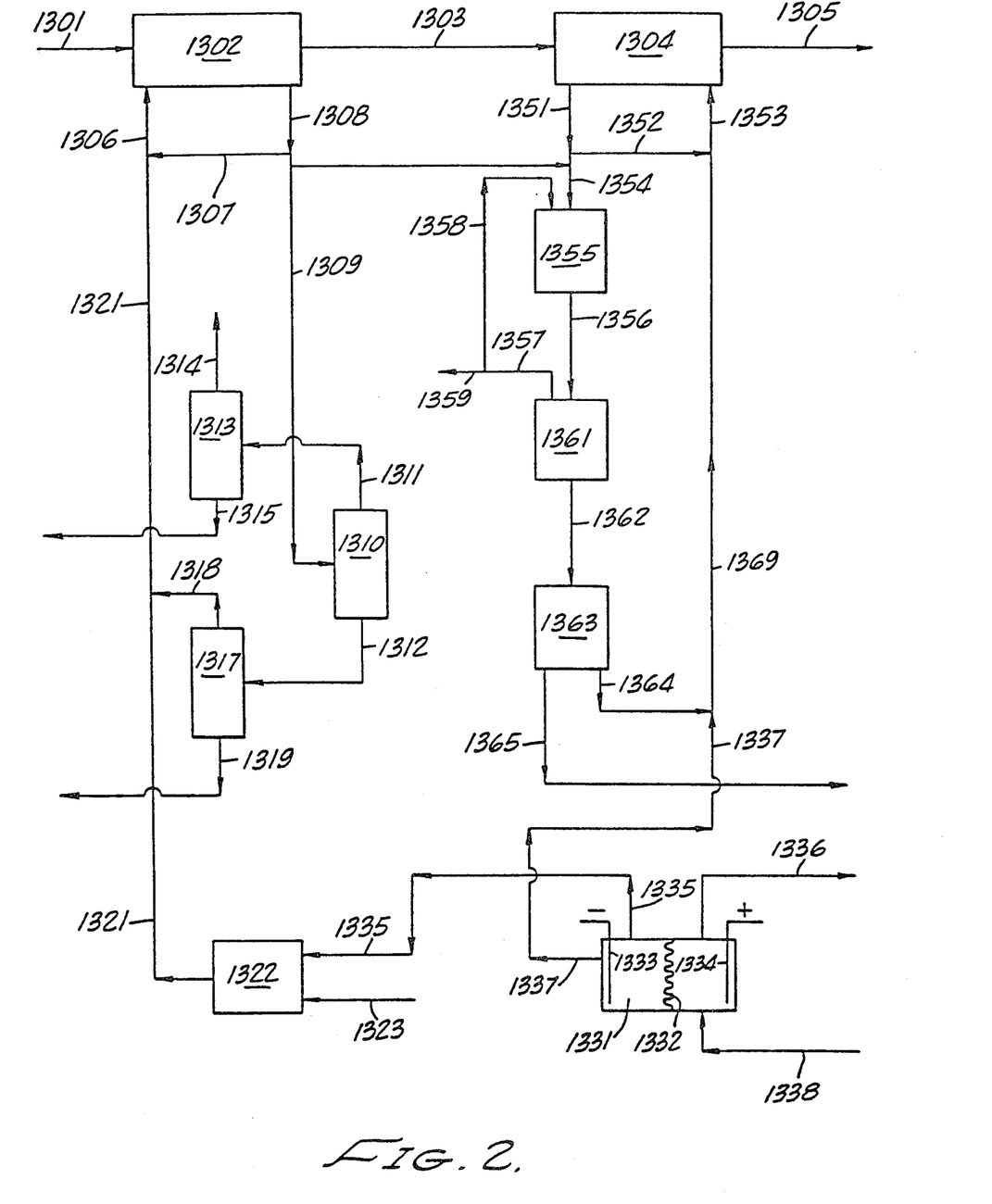
FIG. 2 illustrates the overall removal and product recovery process of this invention as applied to a combustion gas stream. The acid is primarily nitric acid, and the peroxygen substance is hydrogen peroxide.

In FIG. 2, which illustrates the overall oxides of nitrogen removal and product recovery process, combustion gas enters scrubber 1302 via line 1301. Aqueous media that includes hydrogen peroxide enters scrubber 1302 via lines 1321 and 1306, together with recycling aqueous media that includes nitric and sulfuric acids and hydrogen peroxide entering line 1306 via line 1307. In scrubber 1302, the primary reactions take place:

$$NO_2 + \tfrac{1}{2} H_2O_2 \xrightarrow{HNO_3} HNO_3$$

$$NO + 3/2 H_2O_2 \xrightarrow{HNO_3} HNO_3 + H_2O$$

Aqueous product media passing from scrubber 1302 via line 1308 and not recycled through line 1307 passes via line 1309 to distillation tower 1310, where nitric and sulfuric acids are separated from one another by distillation. Nitric acid is taken overhead from distillation tower 1310 via line 1311, and the aqueous nitric acid passes to distillation tower 1313. There, excess water is removed overhead via line 1314 and the 68% aqueous azeotrope of nitric acid as bottoms via line 1315. Sulfuric acid aqueous media passing from distillation tower 1310 passes via line 1312 to tower 1317, from which water and any residual hydrogen peroxide are taken overhead via line 1318, and sulfuric acid at the bottom via line 1319.

Hydrogen peroxide is preferably made on site in plant 1322 by the alternate reduction and oxidation of an alkylanthraquinone, generally 2-ethylanthraquinone, with hydrogen and oxygen. The hydrogen is preferably provided from the electrolysis of potassium chloride, conducted in electrolytic cell 1331, which is used as source of the potassium hydroxide makeup for the alkaline scrubbing step of this process.

Combustion gas passing from oxidation scrubber 1302 includes nitric acid and other higher valence nitrogen oxides, together with carbon dioxide, oxygen and nitrogen. This combustion gas enters alkaline scrubber 1304 via line 1303, wherein a substantial removal of the higher valence nitrogen oxides and nitric acid is effected. The treated exit gas with little nitrogen oxides and sulfur dioxide remaining passes from scrubber 1304 via line 1305 to the atmosphere.

Aqueous alkaline media, including typically potassium carbonate, potassium nitrate, and potassium bicarbonate, enters scrubber 1304 via line 1353. In scrubber 1304, contact between the gas stream and the alkaline aqueous media produces the following reactions:

$HNO_3 + K_2CO_3 \rightarrow KNO_3 + KHCO_3$ $2NO_2 + 2K_2CO_3 + H_2O \rightarrow KNO_3 + KNO_2 + 2KHCO_3$ Product aqueous media passes from scrubber 1304 via line 1351. This media includes potassium nitrite and nitrate, potassium carbonate and bicarbonate, and may contain some hydrogen peroxide. A portion of this aqueous media is recycled to scrubber 1304 via lines 1352 and 1353. When the potassium nitrite/nitrate concentration reaches a sufficient level to warrant product recovery, a portion of the aqueous media passes via line 1354 to nitrite converter 1355. Carbon dioxide, or nitric acid from 1309, enters converter 1355 via line 1358 together with, as necessary, sufficient hydrogen peroxide to oxidize nitrites to nitrates. The carbon dioxide acts to convert potassium carbonate to bicarbonate, thus lowering the pH below 9, which facilitates oxidation of nitrite to nitrate.

The alkaline aqueous product media passes from nitrite converter 1355 via line 1356 to decarbonator 1361. There, by the application of heat, or by steam stripping, potassium bicarbonate is converted to potassium carbonate and carbon dioxide. Carbon dioxide so produced is taken overhead via line 1357 and recovered via line 1359, or cycled to converter 1355 via lines 1357 and 1358.

Product aqueous media including primarily potassium carbonate and nitrate passes from decarbonator 1361 via line 1362 to crystallizer 1363. There, the alkaline aqueous media is cooled to crystallize potassium nitrate therefrom. The potassium nitrate is then centrifuged, dried and removed via line 1365, and the alkaline aqueous media recycled back via line 1364 to line 1369 to join with the recycling aqueous scrubbing media in lines 1352 and 1353.

Makeup potassium hydroxide is preferably produced in cell 1331 by the electrolysis of potassium chloride, which enters the anode compartment of the cell via line 1338. In the cell, chlorine is produced at the anode 1334, and taken overhead via line 1336 for reaction with substances such as ethylene to produce stable, low-volatility, commercially valuable compounds such as ethylene chloride. Permselective cationic exchange membrane 1332 prevents the migration of chloride ions to the cathode region thereby producing a chloride-free potassium hydroxide solution. In the cathode zone, hydrogen is discharged at cathode 1333 and taken overhead via line 1335 to on-site plant 1322 for use in producing hydrogen peroxide via the oxidation/reduction of an alkylanthraquinone. Potassium hydroxide produced in the cathode compartment is taken via line 1337 and combined with the alkaline aqueous scrubbing media entering scrubber 1304 via lines 1369 and 1352.

Figure 3:
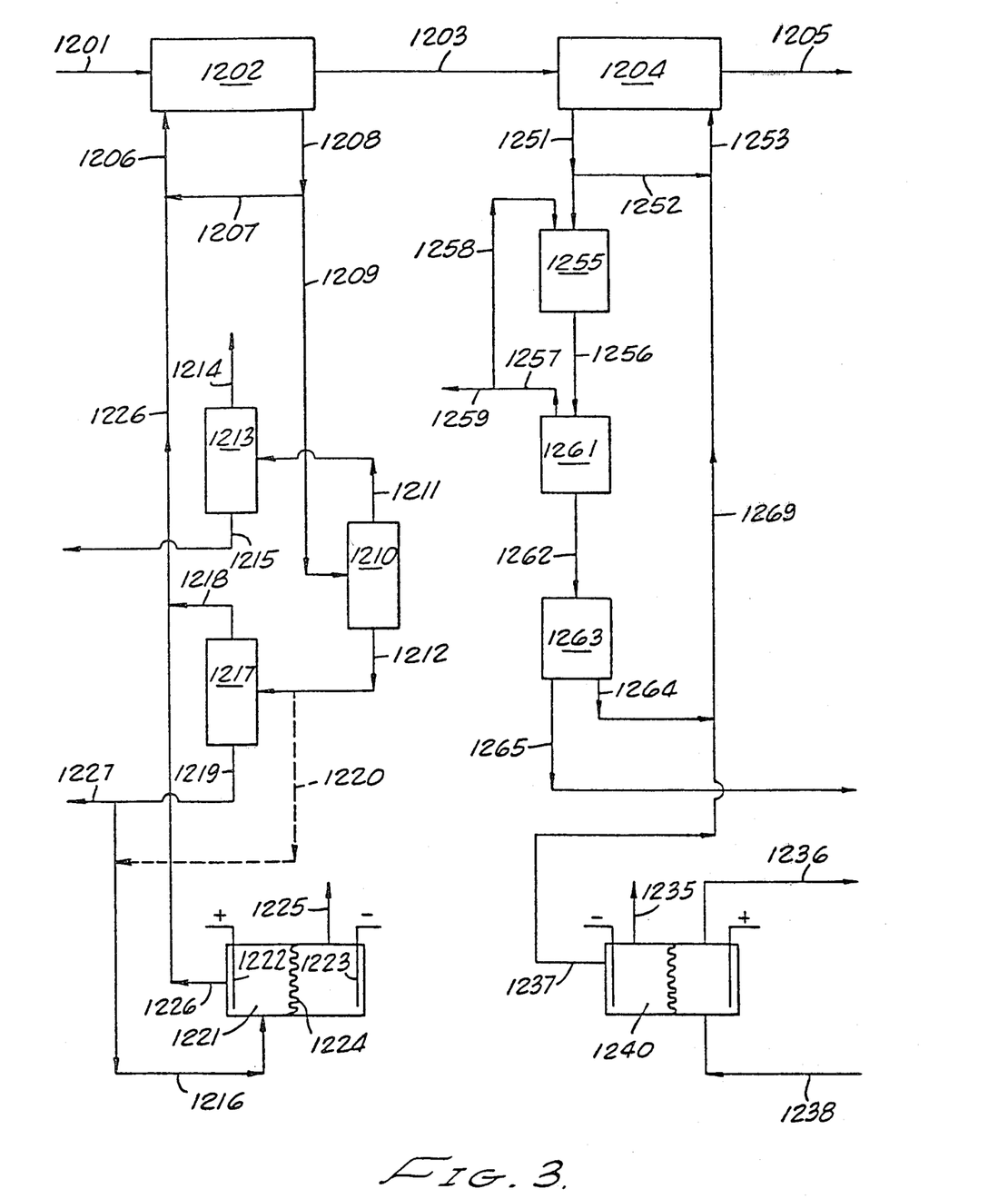
FIG. 3 illustrates the overall removal and product recovery process of the invention as applied to the scrubbing of a combustion gas. The acid is primarily sulfuric acid, and the peroxygen substance is peroxysulfuric acid.

Referring now to FIG. 3, which illustrates the overall oxides of nitrogen removal and product recovery process, combustion gas comprising sulfur dioxide and lower valence nitrogen oxides enters scrubber 1202 via line 1201 after most of the sulfur dioxide has been removed from the gas stream. Aqueous scrubbing media enters oxidation scrubber 1202 via line 1206, which includes peroxysulfuric acid from cell 1221 added through line 1226, recycled aqueous media from line 1207 that includes hydrogen peroxide, sulfuric and nitric acids. In tower 1202, the following reactions take place:

$H_2S_2O_8 + H_2O \rightarrow H_2O_2 + 2H_2SO_4$

Aqueous media passes from tower 1202 via lines 1208 and 1209 to distillation tower 1210, from which nitric acid is taken overhead with water via line 1211 and sulfuric acid is taken below via line 1212. The nitric acid taken via line 1211 passes to stripper 1213, from which excess water is taken overhead via line 1214, and nitric acid is taken below as an aqueous solution that includes (say about 68%) nitric acid. Nitric acid forms a maximum boiling point azeotrope with water which boils at 122° C. The nitric acid may be removed as a product through line 1215, or may be recycled back to scrubber 1202 through line 1226, or may be transferred to the alkali metal nitrate recovery circuit and reacted with the alkali metal carbonate/bicarbonate aqueous media to produce alkali metal nitrate. This may be added at several points prior to or at crystallizer-separator 1263.

The sulfuric acid in aqueous media passing from distillation tower 1210 via line 1212 passes to stripper 1217, from which water and residual hydrogen peroxide are taken overhead via line 1218, and fed into line 1226. Sulfuric acid in the range of 60%-93%, passes below from stripper 1219 via line 1219. Any excess sulfuric acid taken from stripper 1217 via line 1219 may be removed as product via line 1227 with the remainder passing to electrolytic cell 1221 via line 1216 for conversion to peroxysulfuric acid.

In electrolytic cell 1221, peroxysulfuric acid is produced by anodic oxidation with hydrogen gas discharged at the cathode 1223. The reaction in electrolytic cell 1221 is as follows:

Optimum conditions for conversion of sulfuric acid to peroxysulfuric acid occur in the range of 60-80% $H_2SO_4$, a temperature of about 10° C., with about 40-50% of the sulfuric acid being converted.

The gas stream passes from scrubber 1202 via line 1203 to alkaline scrubber 1204, where the nitric acid and other higher valence oxides produced in tower 1202 and carried with the gas stream are treated with incoming aqueous media from line 1253 that includes potassium carbonate/bicarbonate and potassium nitrate. Recycling aqueous media also entering scrubber 1204 via lines 1252 and 1253 typically includes potassium nitrate and nitrite, together with potassium carbonate and potassium bicarbonate. The gas stream essentially free of sulfur dioxide and containing low concentrations of nitrogen oxides, passes from scrubber 1204 via line 1205.

Alkaline aqueous product media, including potassium nitrate, potassium nitrite, potassium carbonate and potassium bicarbonate, and having a pH greater than about 9, passes from scrubber 1204 via lines 1251 and 1254 to nitrite converter 1255. There, the aqueous media is treated with carbon dioxide entering via line 1258 and with an oxidizing agent such as hydrogen peroxide to lower the pH to less than about 9, and to convert any potassium nitrite present to potassium nitrate. The potassium bicarbonate-predominating aqueous product media then passes via line 1256 to decarbonator 1261 where steam stripping or other applied heat converts potassium bicarbonate to potassium carbonate and carbon dioxide. Carbon dioxide so produced is taken overhead via line 1257, and recovered as such from line 1259 or a portion is cycled via line 1258 to nitrite converter 1255 to lower the pH.

The alkaline carbonate aqueous product media passes from decarbonator 1261 to crystallizer/separator 1263 via line 1262, and is there cooled to crystallize potassium nitrate as a solid. Potassium nitrate is centrifuged and dried and removed via line 1265 as relatively pure product. The alkaline mother liquor aqueous media consisting principally of potassium carbonate and soluble potassium nitrate passes via line 1264 into line 1269 for recycle to scrubber 1204 via line 1253.

Makeup potassium for the alkaline aqueous scrubbing media to replace that removed with the potassium nitrate product may be furnished as aqueous potassium hydroxide solution by the electrolysis of potassium chloride, which enters cell 1240 via line 1238. Chlorine gas is produced at the anode, and exits the cell via line 1236. This gas may be combined with ethylene to produce ethylene chloride, a stable, much less volatile and valuable chemical that is a precursor to polyvinylchloride. Hydrogen, taken overhead via line 1235 from the cathode compartment may be used to produce hydrogen peroxide for use in oxidizing nitrites to nitrates in converter 1255 or other purposes. Potassium hydroxide is produced at the cathode of cell 1240 as a chloride-free product which passes from the cell via line 1237 in aqueous media to lines 1269 and 1253.

EXAMPLE I

A gas mixture consisting of 400 parts per million of nitric oxide and 99.6% nitrogen was passed countercurrently to an aqueous scrubbing solution containing 3.0% hydrogen peroxide and 35% nitric acid at 45° C. through a three-foot glass column having a two-inch diameter and packed with ½ inch Pall-type rings. The gas stream was fed at a rate corresponding to about 0.1 feet per second superficial gas velocity and the liquid flow rate was adjusted to just below the flooding point. The concentration of nitrogen oxides in the exit gas following passage through a bubbler filled with 20% potassium carbonate solution was reduced to about 30–35 parts per million of nitrogen oxides, or a removal efficiency of 92%.

A hydrogen peroxide usage of 1.01 times the theoretical requirement was required. Essentially all of the nitric oxide removed appeared as nitric acid.

This example proves the effectiveness and practicability of the duel reagent process of this invention.

EXAMPLE II

The same gas mixture used in Example I was treated in the same equipment under the same conditions, except that the scrubbing solution was a 20% solution of hydrogen peroxide which had a pH of about 6.0. The concentration of nitric oxide in the exit gas was reduced to about 340 parts per million, or a removal efficiency of 15%. The hydrogen peroxide usage was 1.05 times the theoretical. Essentially, all of the nitric oxide removed appeared as nitric acid. This example shows that hydrogen peroxide alone, even at a higher concentration that in Example I, is far less effective than the dual reagent method of this invention.

EXAMPLE III

The same gas mixture treated in Example I was treated in the same equipment under the same conditions with a scrubbing solution containing 3% hydrogen peroxide and 25% sulfuric acid. The concentration of nitrogen oxides was reduced to about 80 parts per million, or a removal efficiency of 80%. The hydrogen peroxide usage was 1.02 times the theoretical. All of the nitric oxide removed appeared as nitric acid. Again, the dual reagent process of this invention proved highly practicable and effective.

EXAMPLE IV

The major reactions taking place in the two-step acid oxidation and alkaline absorption process for removal of nitrogen oxides are as follows:

Stage II-A Acid Oxidation Scrubbing
$NO + 2HNO_3 \rightarrow 3NO_2 + H_2O$
$NO + 3/2 H_2O_2 \rightarrow HNO_3 + H_2O$
$NO_2 + \frac{1}{2} H_2O_2 \rightarrow HNO_3$
Stage II-B Alkaline Absorption Scrubbing
$KOH + KHCO_3 \rightarrow K_2CO_3 + H_2O$
$CO_2 + K_2CO_3 \rightarrow 2KHCO_3$
$HNO_3 + K_2CO_3 \rightarrow KNO_3 + KHCO_3$
$NO_2 + 2K_2CO_3 \rightarrow KNO_2 + KNO_3 + 2KHCO_3$
Nitrite Conversion
$K_2CO_3 + CO_2 + H_2O \rightarrow 2KHCO_3$
$KNO_2 + H_2O_2 \rightarrow KNO_3 + H_2O$
Decarbonation
$2KHCO_3 \rightarrow K_2CO_3 + H_2O + CO_2$
Hydrogen Peroxide Generation Potassium Makeup (Electrolysis)

Ethylene Dichloride Production
$H_2C=CH_2 + Cl_2 \rightarrow ClH_2C-CH_2Cl$

EXAMPLE V

The solubilities in aqueous solution of potassium nitrate, potassium sulfate and potassium chloride are substantially reduced in the presence of potassium carbonate. As Table 1 below shows, an aqueous solution containing 67 grams of potassium carbonate in 100 milliliters of water reduces the solubility of potassium nitrate to one-tenth that in water without potassium carbonate present and that of potassium sulfate by greater than one hundredth that in water alone. Potassium chloride solubilities are reduced by one-fourth to one-eighth.

TABLE 1

| | SOLUBILITY OF KNO₃, K₂SO₄ and KCl IN AQUEOUS K₂CO₃ SOLUTIONS IN GRAMS PER 100 MILLILITERS | | | | | |
|---|---|---|---|---|---|---|
| | IN WATER ALONE | | | IN AQUEOUS MEDIA INCLUDING 67 g K₂CO₃/100 ml SOLUTION | | |
| Temp., °C.: | 10 | 40 | 70 | 10 | 40 | 70 |
| KNO₃ | 21.5 | 64.0 | 138.0 | 2.80 | 6.00 | 13.00 |

TABLE 1-continued

SOLUBILITY OF $KNO_3$, $K_2SO_4$ and KCl IN AQUEOUS $K_2CO_3$ SOLUTIONS IN GRAMS PER 100 MILLILITERS

| | IN WATER ALONE | | | IN AQUEOUS MEDIA INCLUDING 67 g $K_2CO_3$/100 ml SOLUTION | | |
|---|---|---|---|---|---|---|
| Temp., °C.: | 10 | 40 | 70 | 10 | 40 | 70 |
| $K_2SO_4$ | 9.1 | 14.5 | 19.5 | 0.07 | 0.09 | 0.11 |
| KCl | 31.0 | 40.0 | 48.5 | 4.00 | 8.00 | 12.00 |

Nitrogen oxides have valences ranging from +1 to +5, as represented by the following compounds

| Valence | Formula | Compound |
|---|---|---|
| +1 | $N_2O$ | Nitrous oxide |
| +2 | NO | Nitric oxide |
| +3 | $N_2O_3$ | Dinitrogen trioxide |
| +4 | $NO_2,N_2O_4$ | Nitrogen dioxide and Dinitrogen tetroxide |
| +5 | $N_2O_5$ | Dinitrogen pentoxide |
| +3 | $HNO_2$ | Nitrous acid |
| +5 | $HNO_3$ | Nitric acid |

As used herein, references made to increasing or oxidizing an oxide of lower valence nitrogen to an oxide of higher valence nitrogen means oxidizing from a lower valence state to a higher valence state, e.g., from nitric oxide (NO) to nitrogen dioxide ($NO_2$) and from nitrogen dioxide ($NO_2$) to dinitrogen pentoxide ($N_2O_5$) or nitric acid ($HNO_3$), etc.

As used herein, alkali metals include potassium, sodium, lithium, rubidium and cesium and alkaline earths include calcium, magnesium, and strontium.

The process of this invention provides a substantial breakthrough in making the elimination of gaseous pollutants from such gas mixtures as combustion gases both practicable and economic. No practicable process is now known for removing and recovering lower valence nitrogen oxides from such gas mixtures, and none permits the recovery of a saleable product to offset the high operating and capital costs of the plant and equipment needed to effect the removal. The presence of sulfur dioxide in combustion gases only compounds the problems that industry faces today. No process exists for achieving the near 100% removal and recovery of sulfur values from gas mixtures whether or not lower valence nitrogen oxides are present.

The process of this invention meet all these needs. Lower valence nitrogen oxides and particularly nitric oxide, which are typically present in quite low concentration in combustion gas mixtures, cannot be removed by alkaline scrubbing alone, nor does oxidation of nitric oxide alone solve the problem. Combining the use of an alkaline metal carbonate/bicarbonate scrubbing media, which forms an alkaline acceptor, with the dual reagent oxidation system makes possible the trapping of nitrogen oxides and their removal from gas streams. The resulting product aqueous media is particularly amenable to treatment for removal and recovery of commercially valuable products in commercial quantities. Alkali metal nitrites and nitrates formed in the alkaline scrubbing are strongly held by the carbonate/bicarbonate acceptor system and may be recycled time and time again through the treating process until the concentration of each rises to a level where recovery is commercially practicable.

I claim:

1. A process for removing oxides of nitrogen from a combustion gas mixture including carbon dioxide, nitric oxide and other oxides of nitrogen comprising:
    (a) treating said gas mixture in a first zone by introducing to said zone an aqueous media which is a mixture of an acid and an oxidant, said acid being selected from the group consisting of sulfuric and nitric acids, and said oxidant being selected from the group consisting of hydrogen peroxide and peroxysulfuric acid;
    (b) maintaining said oxidant in excess during said treating such that the ratio of said oxidant to nitric oxide, dinitrogen trioxide and nitrogen dioxide exceeds the stoichiometric amount needed to convert said lower valence oxides of nitrogen to nitric acid;
    (c) forming a product aqueous media which includes nitric acid and recycling a portion of the product aqueous media to said first zone of gas treating;
    (d) treating said gas stream in a second zone with an aqueous alkaline media which includes the carbonate-bicarbonate of an alkali metal which is in stoichiometric excess to the nitrogen oxides and nitric acid in the gas stream to form a second zone product aqueous media which includes alkali metal nitrate, alkali metal nitrite and alkali metal bicarbonate-carbonate; then
    (e) lowering the pH of the product aqueous media from Step (d) so that it is less than pH=9.0 by addition of carbon dioxide or nitric acid and adding hydrogen peroxide to convert at least a portion of the alkali metal nitrite to alkali metal nitrate;
    (f) crystallizing and recovering alkali metal nitrate from the product aqueous media from Step (e) in the presence of alkali metal carbonate-bicarbonate; and
    (g) recycling the product aqueous media from Step (f) to said second zone of gas treating.

2. A process for removing oxides of nitrogen from a combustion gas mixture including carbon dioxide, nitric oxide and other oxides of nitrogen comprising:
    (a) treating said gas mixture in a first zone by introducing to said zone an aqueous media which is a mixture of an acid and an oxidant, said acid being selected from the group consisting of sulfuric and nitric acids, and said oxidant being selected from the group consisting of hydrogen peroxide and peroxysulfuric acid;
    (b) maintaining said oxidant in excess during said treating such that the ratio of said oxidant to nitric oxide, dinitrogen trioxide and nitrogen dioxide exceeds the stoichiometric amount needed to convert said lower valence oxides of nitrogen to nitric acid;
    (c) forming a product aqueous media which includes nitric acid and recycling a portion of the product aqueous media to said first zone of gas treating;
    (d) treating said gas stream in a second zone with an aqueous alkaline media which includes the carbonate-bicarbonate of an alkali metal which is in stoichiometric excess to the nitrogen oxides and nitric acid in the gas stream to form a second zone product aqueous media which includes alkali metal nitrate, alkali metal nitrite and alkali metal bicarbonate-carbonate; then
    (e) lowering the pH of the product aqueous media from Step (d) so that it is less than pH=9.0 by addition of carbon dioxide or nitric acid and adding hydrogen peroxide to convert at least a portion of the alkali metal nitrite to alkali metal nitrate;

(f) further comprising heating the product aqueous media to convert at least a portion of the alkali metal bicarbonate to dibasic alkali metal carbonate and liberate gaseous carbon dioxide;

(g) crystallizing and recovering alkali metal nitrate from the product aqueous media in the presence of alkali metal carbonate-bicarbonate; and (h) recycling the product aqueous media from Step (g) to said second zone of gas treating.

3. A process for removing oxides of nitrogen from a combustion gas mixture including carbon dioxide, nitric oxide and other oxides of nitrogen comprising:

(a) treating said gas mixture in a first zone by introducing to said zone an aqueous media which is a mixture of an acid and an oxidant, said acid being selected from the group consisting of sulfuric and nitric acids, and said oxidant being selected from the group consisting of hydrogen peroxide and peroxysulfuric acid;

(b) maintaining said oxidant in excess during said treating such that the ratio of said oxidant to nitric oxide, dinitrogen trioxide and nitrogen dioxide exceeds the stoichiometric amount needed to convert said lower valence oxides of nitrogen to nitric acid;

(c) forming a product aqueous media which includes nitric acid and recycling a portion of the product aqueous media to said first zone of gas treating;

(d) treating said gas stream in a second zone with an aqueous alkaline media which includes the carbonate-bicarbonate of an alkali metal which is in stoichiometric excess to the nitrogen oxides and nitric acid in the gas stream to form a second zone product aqueous media which includes alkali metal nitrate, alkali metal nitrite and alkali metal bicarbonate-carbonate; then (e) further comprising crystallizing and recovering alkali metal nitrate from the product aqueous media in the presence of alkali metal carbonate-bicarbonate and recycling the product aqueous media to said second zone of gas treating.

4. A process for removing oxides of nitrogen from a combustion gas mixture including carbon dioxide, nitric oxide and other oxides of nitrogen comprising:

(a) treating said gas mixture in a first zone by introducing to said zone an aqueous media which is a mixture of an acid and an oxidant, said acid being selected from the group consisting of sulfuric and nitric acids, and said oxidant being selected from the group consisting of hydrogen peroxide and peroxysulfuric acid;

(b) maintaining said oxidant in excess during said treating such that the ratio of said oxidant to nitric oxide, dinitrogen trioxide and nitrogen dioxide exceeds the stoichiometric amount needed to convert said lower valence oxides of nitrogen to nitric acid;

(c) forming a product aqueous media which includes nitric acid and recycling a portion of the product aqueous media to said first zone of gas treating;

(d) treating said gas stream in a second zone with an aqueous alkaline media which includes the carbonate-bicarbonate of an alkali metal which is in stoichiometric excess to the nitrogen oxides and nitric acid in the gas stream to form a second zone product aqueous media which includes alkali metal nitrate, alkali metal nitrite and alkali metal bicarbonate-carbonate; then (e) further comprising heating the product aqueous media to convert at least a portion of the alkali metal bicarbonate to dibasic alkali metal carbonate and liberate gaseous carbon dioxide;

(f) crystallizing and recovering alkali metal nitrate from the product aqueous media in the presence of alkali metal carbonate-bicarbonate; and (g) recycling the product aqueous media from Step (f) to said second zone of gas treating.

5. The process of claim 1 wherein said combustion gas also contains sulfur dioxide and during said first zone treating sulfuric and nitric acids are formed in the product aqueous media, said product aqueous media from Step (c) then being transferred and reacted with the alkali metal hydroxide catholyte liquor made by the electrolysis of alkali metal chloride in an electrolytic cell equipped with a hydraulically impermeable cationic-exchange membrane to form a mixture of alkali metal sulfate and alkali metal nitrate.

6. A process for the removal of oxides of nitrogen from a combustion gas mixture including nitrogen dioxide and carbon dioxide in which said gas is treated in a zone with an aqueous media which includes the carbonate-bicarbonate of an alkali metal to form a product aqueous media which includes alkali metal nitrite, alkali metal nitrate and additional alkali metal carbonate-bicarbonate, the process comprising:

(a) lowering the pH of the product aqueous media to less than pH=9.0 to facilitate the oxidation of the alkali metal nitrite to alkali metal nitrate by treating the product aqueous media with carbon dioxide or nitric acid;

(b) treating the product aqueous media from Step (a) with hydrogen peroxide to oxidize at least a portion of the alkali metal nitrite to alkali metal nitrate;

(c) crystallizing and recovering at least a portion of the alkali metal nitrate in the product aqueous media from Step (b) in the presence of alkali metal carbonate-bicarbonate; and (d) recycling the product aqueous media from Step (c) to the zone of said gas treating.

7. The process of any of claims 1-4 and 5-6 in which the alkali metal is potassium.

8. The process of either claim 2 or 4, in which the gaseous carbon dioxide liberated is recovered.

9. The process of any one of claims 1-4 and 6 in which the alkali metal for either said alkali metal carbonate or bicarbonate or both is provided as alkali metal hydroxide catholyte liquor which is made by the electrolysis of alkali metal chloride in an electrolytic cell equipped with a hydraulically impermeable cationic-exchange membrane.

10. The process of claim 9 wherein the hydrogen also derived from said electrolysis of alkali metal chloride is used for the production of hydrogen peroxide.

* * * * *